(12) United States Patent
Yoshida

(10) Patent No.: US 10,902,878 B2
(45) Date of Patent: Jan. 26, 2021

(54) TAPE DEVICE AND CONTROLLER

(71) Applicant: FUJITSU LIMITED, Kawasaki (JP)

(72) Inventor: Taketoshi Yoshida, Kunitachi (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/856,091

(22) Filed: Apr. 23, 2020

(65) Prior Publication Data
US 2020/0365182 A1 Nov. 19, 2020

(30) Foreign Application Priority Data

May 13, 2019 (JP) ................. 2019-090736

(51) Int. Cl.
*G11B 27/36* (2006.01)
*G11B 15/087* (2006.01)
*G11B 20/12* (2006.01)
*G11B 27/10* (2006.01)
*G11B 5/008* (2006.01)

(52) U.S. Cl.
CPC ........ *G11B 15/087* (2013.01); *G11B 5/00813* (2013.01); *G11B 20/1201* (2013.01); *G11B 27/107* (2013.01); *G11B 27/36* (2013.01)

(58) Field of Classification Search
CPC ......... G11B 27/336; G11B 5/00; G11B 20/12; G11B 2020/183; G11B 15/005; G11B 5/54; G11B 5/5547; G11B 2020/1062

USPC ............ 360/24, 25, 48, 54, 72.1, 75, 78.07; 369/47.32, 47.33

See application file for complete search history.

(56) References Cited

U.S. PATENT DOCUMENTS 8,037,346 B2 * 10/2011 Katagiri ................. G11B 27/34
714/6.13
2013/0044386 A1 2/2013 Sato
2014/0351294 A1 11/2014 Kumano et al.

FOREIGN PATENT DOCUMENTS

JP  2013-041646 A  2/2013
JP  2014-229235 A  12/2014

* cited by examiner

*Primary Examiner* — Nabil Z Hindi
(74) *Attorney, Agent, or Firm* — Fujitsu Patent Center

(57) ABSTRACT

A tape device includes: a tape drive configured to read and write data to a tape medium; and a processor configured to: determine, when requested to read data from a first segment and a second segment on the tape medium, a data amount in a third segment located between the first segment and the second segment; compare the data amount with a threshold value that is determined based on a reading characteristic of the tape drive; instruct the tape drive, when the data amount is the threshold value or more, to read data from the first segment, skip the third segment, and read data from the second segment; and instruct the tape drive, when the data amount is less than the threshold value, to continuously read data from the first segment, the third segment, and the second segment.

9 Claims, 14 Drawing Sheets

| BLOCK SIZE (BITE) | THRESHOLD (NUMBER OF BLOCKS) |
|---|---|
| 1M | 7 |
| 4M | 3 |
| 10M | 1 |
| 100M | 1 |
| 1000M | 1 |

TAPE DEVICE AND CONTROLLER

CROSS-REFERENCE TO RELATED APPLICATION

This application is based upon and claims the benefit of priority of the prior Japanese Patent Application No. 2019-90736, filed on May 13, 2019, the entire contents of which are incorporated herein by reference.

FIELD

The embodiments discussed herein are related to a tape device and a controller.

BACKGROUND

Tape media such as magnetic tapes have been widely used as mass-storage and low-cost storage media. One technique about such tape media has been proposed as follows. For example, there has been provided a tape drive device that determines whether data are stored in a magnetic tape or a nonvolatile semiconductor memory in a tape cartridge based on a result on the comparison of transfer rate of data from a host machine with a rate threshold.

Another technique about a distributed storage system has been proposed. For example, a controller included in such system uses multiple types of processing index values indicating the processing load state to select data to be transferred between storage devices for reducing loads.

Related techniques are disclosed in, for example, Japanese Laid-open Patent Publication No. 2013-41646 and Japanese Laid-open Patent Publication No. 2014-229235.

SUMMARY

According to an aspect of the embodiments, a tape device includes: a tape drive configured to read and write data to a tape medium; and a processor configured to: determine, when requested to read data from a first segment and a second segment on the tape medium, a data amount in a third segment located between the first segment and the second segment; compare the data amount with a threshold value that is determined based on a reading characteristic of the tape drive; instruct the tape drive, when the data amount is the threshold value or more, to read data from the first segment, skip the third segment, and read data from the second segment; and instruct the tape drive, when the data amount is less than the threshold value, to continuously read data from the first segment, the third segment, and the second segment.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a view illustrating exemplary configuration of a threshold table;

DESCRIPTION OF EMBODIMENTS

When plural data segments arranged on a tape medium are read in a tape travelling direction by skipping intermediate data segments, a positioning operation of a magnetic head is performed with respect to a start position of a data segment to be read next after reading one data segment. When the length of the intermediate data segments is long to some extent, the travelling rate of the tape medium may be increased, resulting in that time for the positioning operation is shorter than time taken when the intermediate data segments are read. When the length of the intermediate data segments is short, that is, the distance between the read data segments is small, the time for the positioning operation may be longer than the time taken when the intermediate data segments are read. A reason for this is that the effect of a time loss caused by pause and restart of the travelling of the tape medium is large in the time for the positioning operation. For this reason, when data are read from the tape medium by skipping short intermediate data segments, total time taken for reading may become disadvantageously longer than when the short intermediate data segments are also read.

Hereinafter, description is given of embodiments of the present disclosure with reference to the drawings.

First Embodiment

Figure 1:
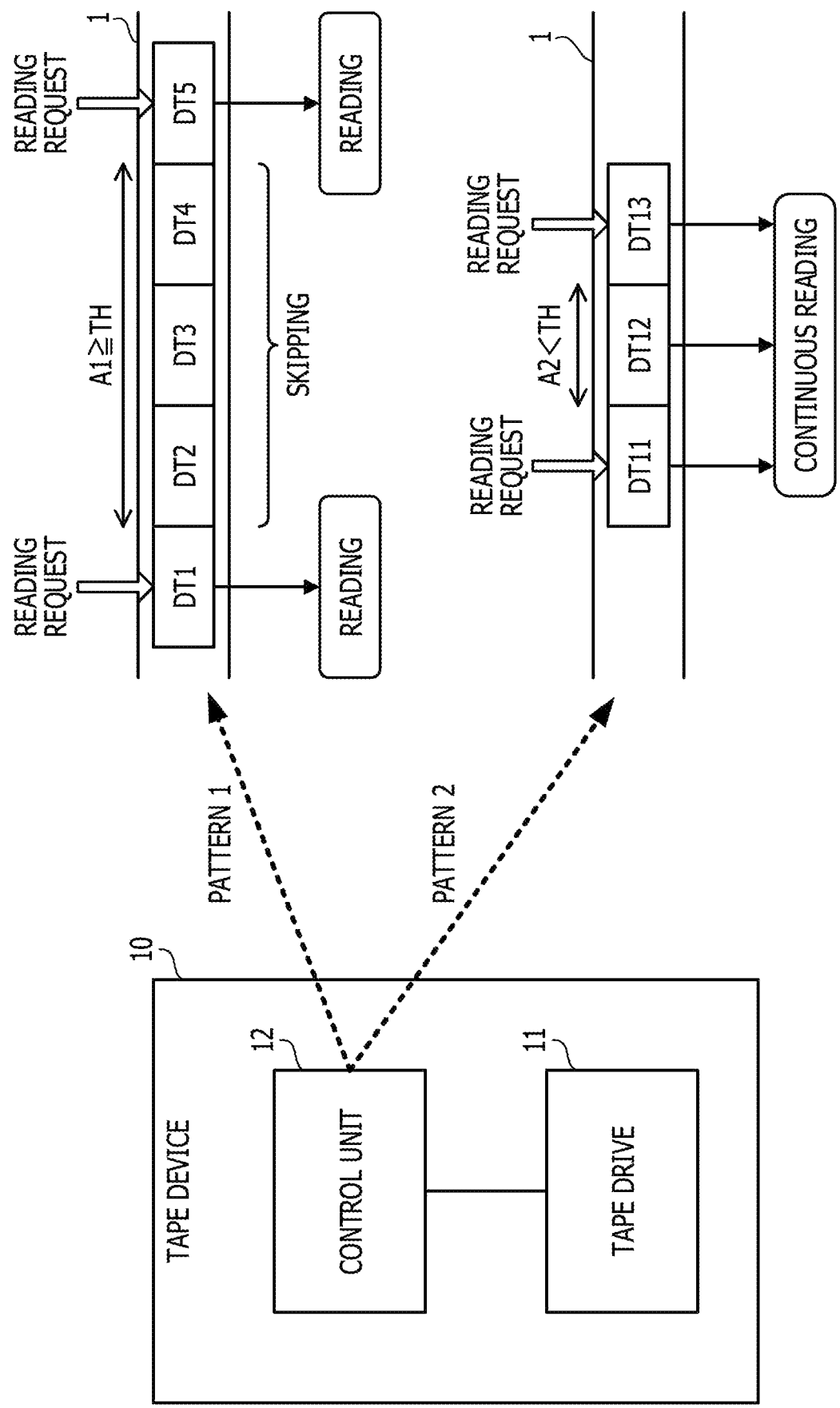
FIG. 1 is a view illustrating exemplary configuration and processing of a tape device according to a first embodiment.

FIG. 1 is a view illustrating exemplary configuration and processing of a tape device according to a first embodiment. A tape device 10 illustrated in FIG. 1 has a tape drive 11 that reads and writes data using a magnetic tape 1, which is an example of a tape medium, and a control unit 12.

The control unit 12 is embodied as, for example, a computer that causes a processor to perform a program to execute various processing. The control unit 12 controls reading of data from the magnetic tape 1 in the tape drive 11 according to a following procedure.

In response to a request to read data from a first segment and a second segment in the magnetic tape 1, the control unit 12 determines a data amount in a third segment located between the first segment and the second segment. The control unit 12 compares the determined data amount with a predetermined determination threshold. The determination threshold is determined based on reading characteristics of the tape drive 11.

When the comparison result indicates that the determined data amount is the determination threshold or more, the control unit 12 instructs the tape drive 11 to read data from the first segment and the second segment, and to skip the third segment. When the determined data amount is less than the determination threshold, the control unit 12 instructs the tape drive 11 to continuously read data from the first segment, the second segment, and the third segment. This may reduce time for the control unit 12 to read data from the magnetic tape 1.

Using two patterns, specific processing of the control unit 12 will be described below.

In a pattern 1 illustrated in FIG. 1, it is assumed that, in the state where data DT1 to DT5 are written in the magnetic tape 1, reading of the data DT1 and DT5 is requested. In this case, the data DT1 correspond to data in the first segment, the data DT5 correspond to data in the second segment, and the data DT2 to DT4 correspond to data in the third segment.

The control unit 12 determines a data amount A1 in the third segment. In the pattern 1, the total data amount of the data DT2 to DT4 is determined as the data amount A1. The control unit 12 compares the data amount A1 with a determination threshold TH. In the pattern 1, it is determined that the data amount A1 is the determination threshold TH or more. In this case, the control unit 12 instructs the tape drive 11 to read the data DT1 and DT5 in the first segment and the second segment and skip the third segment. Thereby, the tape drive 11 reads the data DT1 and then, skips data DT2 to DT4 and reads the data DT5.

In a pattern 2 illustrated in FIG. 1, it is assumed that, in the state where data DT11 to DT13 are written in the magnetic tape 1, reading of the data DT11 and DT13 is requested. In this case, the data DT11 correspond to data in the first segment, the data DT13 correspond to data in the second segment, and the data DT12 correspond to data in the third segment.

The control unit 12 determines a data amount A2 in the third segment. In the pattern 2, the total data amount of the data DT12 is determined as the data amount A2. The control unit 12 compares the data amount A2 with the determination threshold TH. In the pattern 2, it is determined that the data amount A1 is less than the determination threshold TH. In this case, the control unit 12 instructs the tape drive 11 to continuously read data DT11, DT12, and DT13 from the first segment, the second segment, and the third segment. Thereby, the tape drive 11 continuously read the data DT11, DT12, and DT13. The control unit 12, for example, abandons the read data DT12, and outputs only the data DT11 and DT13 to a source of the reading request.

When the third segment is long to some extent (has some data amount), the travelling rate of the magnetic tape 1 at skipping of the third segment may be increased than at reading of data. For this reason, time taken to skip the segment is shorter than time taken to read data from the segment. When the third segment is short (the data amount is small), time taken to skip the segment may be longer than time taken to read data from the segment.

For example, when the third segment is skipped, travelling of the magnetic tape 1 is paused at the end of reading of data from the first segment, and then, is restarted to move the magnetic head to a head position of the second segment. When the third segment is short, the effect of a time loss caused by such pause and restart of the travelling of the magnetic tape 1 becomes large. As a result, time taken to skip the third segment may be longer than time taken to read data from the segment. When the third segment is small, the travelling rate of the magnetic tape 1 at skipping may not be increased to a highest rate, contributing to an increase in time for skipping.

The above-mentioned determination threshold is determined as the data amount in the third segment at an inversion of the relation in length between time taken to skip the third segment and time taken to continuously read data in the third segment and data in the segments preceding and following the third segment. The control unit 12 may use the determination threshold to determine whether to skip the third segment or continuously read data in the first to third segments, thereby reducing the total time for reading.

Second Embodiment

Figure 2:
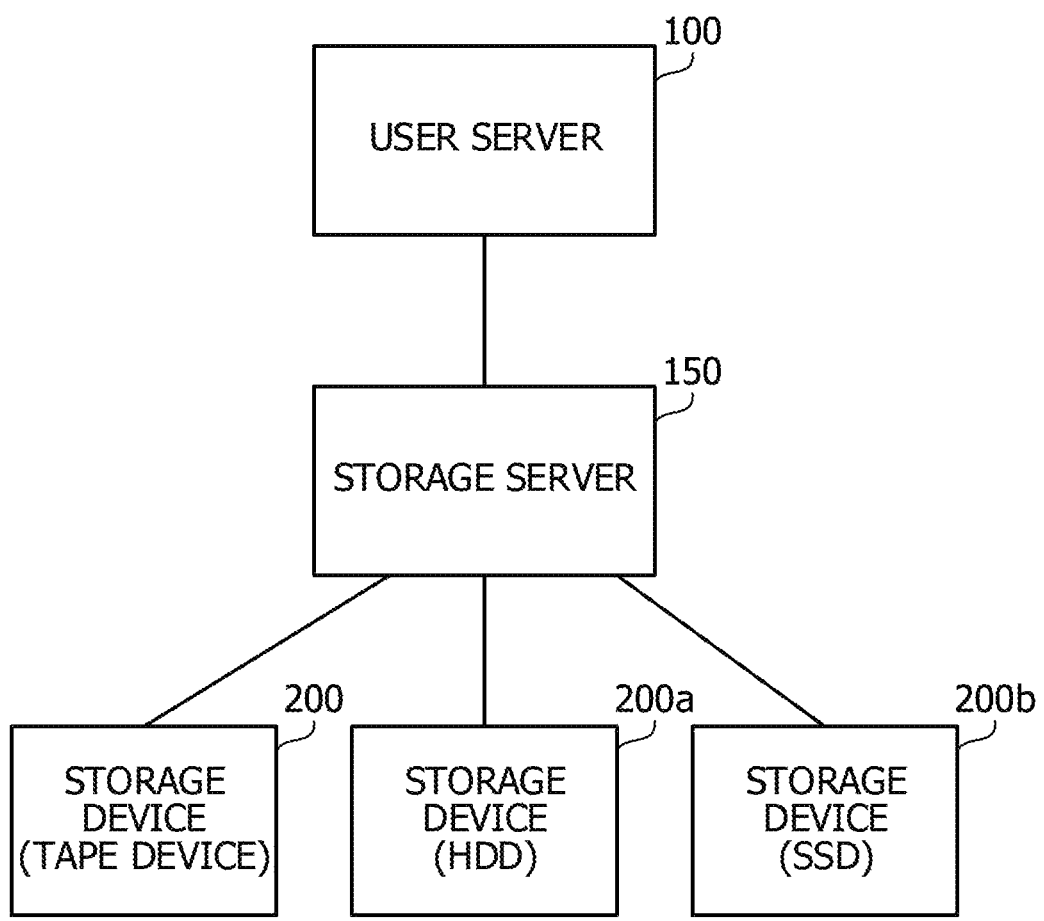
FIG. 2 is a view illustrating exemplary configuration of a storage system according to a second embodiment.

FIG. 2 is a diagram illustrating an exemplary configuration of a storage system according to a second embodiment. The storage system illustrated in FIG. 2 includes a user server 100, a storage server 150, and storage devices 200, 200a, and 200b. The storage device 200 is an example of the tape device 10 illustrated in FIG. 1.

The storage system realizes an object storage system including storages in the storage devices 200, 200a, and 200b as storage areas. The user server 100 handles data as an object and specifies identification information on the object to the storage server 150, thereby requesting writing/reading of the object into/from the storage. In response to the request from the user server 100, the storage server 150 accesses the storages in the storage devices 200, 200a, and 200b.

The storage device 200 includes a tape drive using a magnetic tape. For example, the storage device 200 is a tape device using the magnetic tape as a storage. The storage device 200a includes a hard disk drive (HDD) as a storage. The storage device 200b includes a solid state drive (SSD) as a storage. As described above, the storage system includes the plural types of storages having different access capabilities. For example, the storage devices 200b, 200a, and 200 are listed in descending order of access capabilities.

According to the frequency of access to the object, the storage server 150 controls which of the storage devices 200, 200a, and 200b stores the object. For example, the storage server 150 stores the object having a high access frequency in the storage of the storage device 200b. The storage server 150 stores the object having a low access frequency in the storage of the storage device 200. The storage server 150 stores the object having an intermediate access frequency in the storage of the storage device 200a. According to a variation in access frequency, the storage server 150 moves the object among the storages in the storage devices 200, 200a, and 200b. In this manner, the storage server 150 performs hierarchical control for hierarchizing the storage areas by using the storages of different access capabilities.

For example, the storage device 200 may be coupled to the storage server 150 via another server for controlling the access to the storage device 200. The storage device 200a may be coupled to the storage server 150 via another server for controlling the access to the storage device 200a. The storage device 200b may be coupled to the storage server 150 via an another server for controlling the access to the storage device 200b.

The storage device 200 using the magnetic tape will be described below. In following description, the storage device 200 is represented as "tape device 200".

Figure 3:
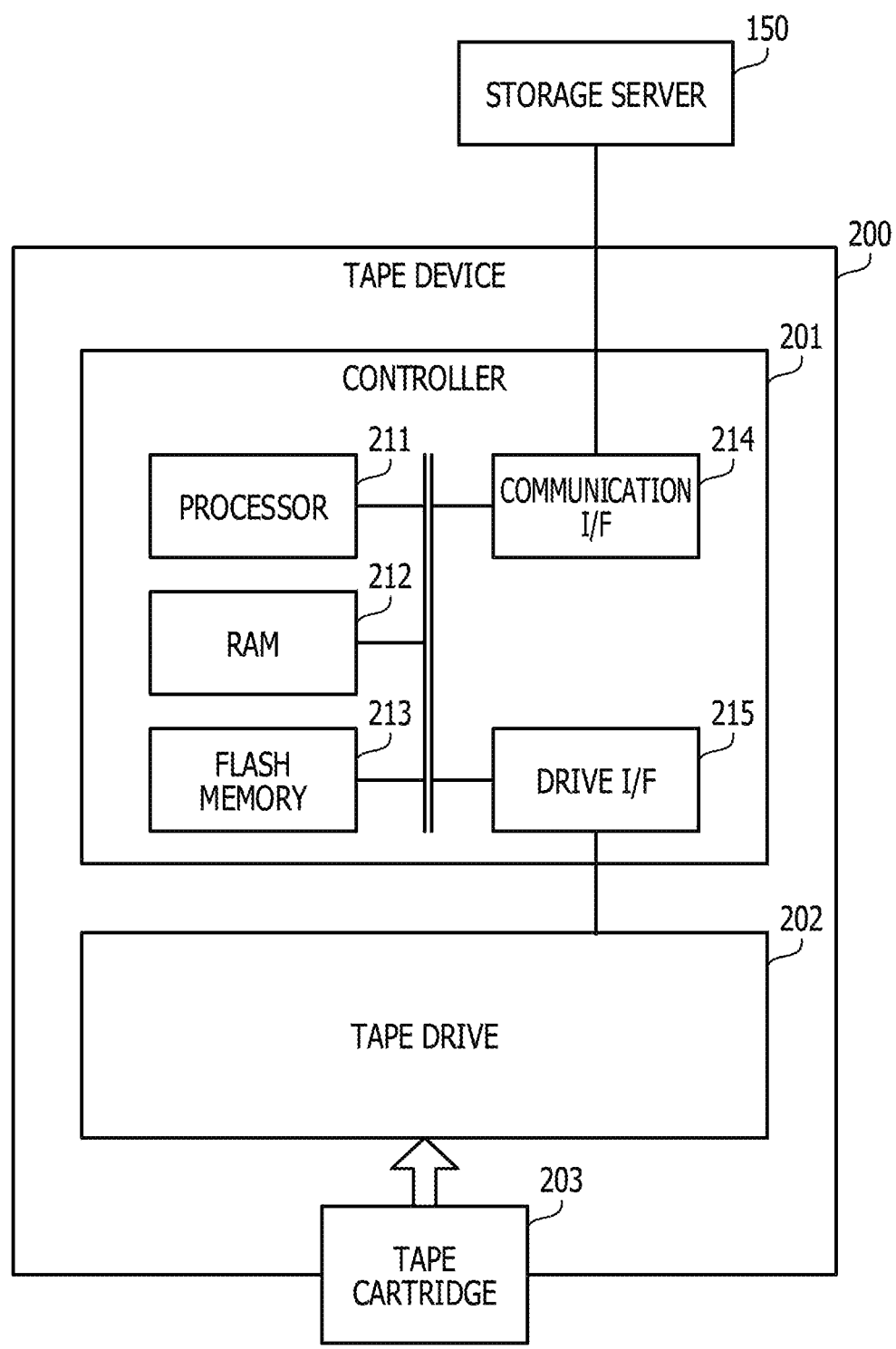
FIG. 3 is a view illustrating exemplary internal configuration of the tape device.

FIG. 3 is a view illustrating exemplary internal configuration of the tape device. As illustrated in FIG. 3, the tape device 200 includes a controller 201 and a tape drive 202. A tape cartridge 203 that stores the magnetic tape is mounted on the tape drive 202.

In response to a request from the storage server 150, the controller 201 controls a data writing operation and a data reading operation of the tape drive 202. Under control of the controller 201, the tape drive 202 performs the data writing operation onto the magnetic tape in the tape cartridge 203, and the data reading operation from the magnetic tape. For example, the tape drive 202 performs writing and reading by using a magnetic tape that conforms to Liner Tape-Open (LTO) standard.

The controller 201 includes a processor 211, a random-access memory (RAM) 212, a flash memory 213, a communication interface (I/F) 214, and a drive interface (I/F) 215.

The processor 211 collectively controls the entire controller 201. The processor 211 is, for example, a central processing unit (CPU), a microprocessor unit (MPU), a digital signal processor (DSP), an application-specific integrated circuit (ASIC), or a programmable logic device (PLD). The processor 211 may be a combination of two or more elements from among a CPU, an MPU, a DSP, an ASIC, and a PLD.

The RAM 212 is a main memory in the tape device 200. The RAM 212 temporarily stores at least a part of programs performed by the processor 211. The RAM 212 stores various data used in processing of the processor 211. The flash memory 213 is an auxiliary memory in the tape device 200. The flash memory 213 stores the programs performed by the processor 211 and various data. The communication interface 214 is an interface for communicating with another device (for example, the storage server 150). The drive interface 215 is an interface for communicating with the tape drive 202.

The tape device 200 may be, for example, a tape library device including a plurality of tape drives 202, a conveyance mechanism for the tape cartridge 203, a storage unit of the tape cartridge 203, and so on.

Figure 4:
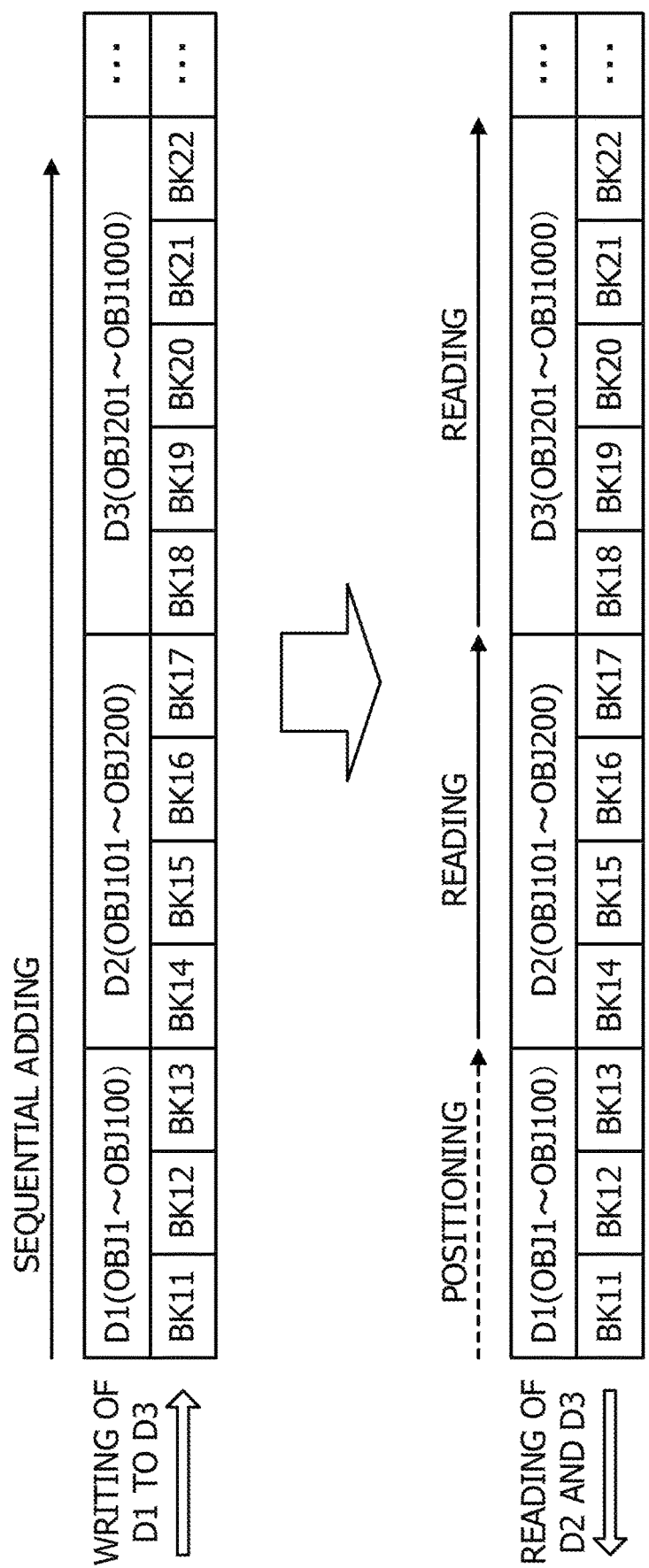
FIG. 4 is a view illustrating a first comparative example of object reading and writing operations using a magnetic tape.
Figure 5:
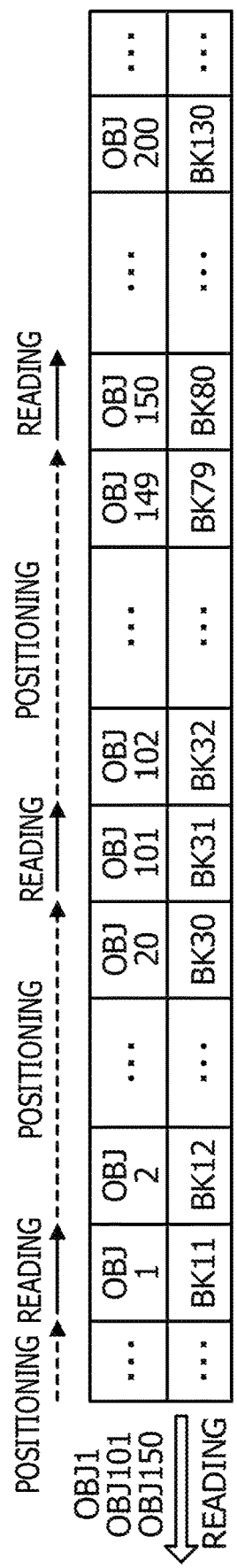
FIG. 5 is a view illustrating a second comparative example of the object reading and writing operations using the magnetic tape.

With reference to FIGS. 4 and 5, comparative examples of an object writing operation and an object reading operation that uses the magnetic tape will be described below.

FIG. 4 is a view illustrating a first comparative example of the object reading and writing operations using the magnetic tape.

Data requested to be written are sequentially written onto the magnetic tape. An upper side in FIG. 4 indicates that writing of data D1 divided into objects OBJ1 to OBJ100, data D2 divided into objects OBJ101 to OBJ200, and data D3 divided into objects OBJ201 to OBJ1000 are requested in this order. In this example, the data D1 is written into blocks BK11 to BK13 on the magnetic tape, the data D2 is written into following blocks BK14 to BK17 on the magnetic tape, and the data D3 is written into following blocks BK18 to BK22 on the magnetic tape. The "block" refers to a unit storage area of the magnetic tape and is uniform in size.

A lower side in FIG. 4 indicates that reading of the data D2 and D3 among the written data D1 to D3 is requested. In this case, first, the magnetic head is positioned (located) on a head position of the data D2 on the magnetic tape, for example, a start position of the block BK14. In the positioning operation, travelling of the magnetic tape moves the magnetic head to the start position of the block BK14. When the magnetic head is disposed at the start position of the block BK14, the magnetic head reads the data D2 from the blocks BK14 to BK17 and further reads the data D3 from the blocks BK18 to BK22.

Originally, data of relatively large size have been often written into the object storage. For example, massive data in the order of gigabytes and terabytes have been often written onto the magnetic tape. This is due to that the magnetic tape has been mainly used for backup of disk images and data images in the units of partition on the storage area. It is unlikely to read only a part of such data. For example, in the example in FIG. 4, reading in units of data such as data D1, D2, and D3 may be requested, while reading in units of objects included in the data D1 to D3 is less requested.

In recent object storages, with the increasing range of uses, the variety of size of handled data has been increased. For example, the case of writing small-sized data of about a few dozens of kilobytes has increased. The case of requesting reading in units of small-sized data has also increased. Against this backdrop, there is a demand that the tape drive may read data of various sizes from a few dozens of kilobytes to a few gigabytes more rapidly.

For example, in the hierarchical control of storages as illustrated in FIG. 2, the magnetic tape is also handled in the same manner as HDD and SSD. For this reason, even when the object having a low access frequency is written onto the magnetic tape, there is a high possibility that reading of the object on the magnetic tape is requested, and in this case, it is desired to read data as rapidly as possible.

FIG. 5 is a view illustrating a second comparative example of the object reading and writing operations using the magnetic tape.

When objects of uniform size are handled, to make object reading/writing efficient, the block size may be associated with the object size. For example, the block size may be set such that a constant multiplication of the block size coincides with the object size.

In FIG. 5, as an example, the block size coincides with the object size. In the example in FIG. 5, it is assumed that objects OBJ1 to OBJ20 are continuously written onto the magnetic tape and then, objects OBJ101 to OBJ200 are continuously written onto the magnetic tape. The objects OBJ1 to OBJ20 are written into the blocks BK11 to BK30, respectively, and the objects OBJ101 to OBJ200 are written into following blocks BK31 to BK130, respectively.

Supposing that reading in units of objects is requested in the above-mentioned state. For example, it is assumed to request reading of the objects OBJ1, OBJ101, and OBJ150. In this case, first, the magnetic head is positioned at a start position of the block BK11, which is a head position of the object OBJ1. When the magnetic head is disposed at the start position of the block BK11, the magnetic head reads the object OBJ1 from the block BK11. Next, the magnetic head is disposed at a start position of the block BK31, which is a head position of the object OBJ101. When the magnetic head is disposed at the start position of the block BK31, the magnetic head reads the object OBJ101 from the block BK31. The magnetic head is positioned at a start position of the block BK80, which is a head position of the object OBJ150. When the magnetic head is disposed at the start position of the block BK80, the magnetic head reads the object OBJ150 from the block BK80.

As described above, in requesting reading in units of small-sized objects, there is a possibility to frequently request reading of objects that are away from each other on the magnetic tape. In this case, the positioning operation of the magnetic head and the data reading operation of the magnetic head are repeatedly performed. This means that pause and restart of travelling of the magnetic tape are repeated, generating a large time loss.

In the positioning operation of the magnetic head, when the moving distance of the magnetic head is long to some extent, the travelling rate of the magnetic tape may be increased than the travelling rate in the data reading operation of the magnetic head. For this reason, even when pause and restart of travelling of the magnetic tape occurs, time taken to position the magnetic tape is shorter than time taken to continuously read data from the same segment.

When the object size is small, each segment in which the positioning operation of the magnetic head is performed may be short. When the segment is short, out of the time for the positioning operation, time lost due to pause and restart of travelling of the magnetic tape becomes relatively long, leading to a large time loss in the positioning operation. When the segment is short, the travelling rate of the magnetic tape may not be increased to the highest rate, making the travelling rate lower than when the segment is long. When the positioning operation of the magnetic head in such small segment frequently occurs, total time taken to read data disadvantageously increases.

In following description, among segments on the magnetic tape, the segment requested to be read is referred to as "segment to be read". The segment that is not requested to be read between two segments to be read is referred to as "segment not to be read". For example, in FIG. 5, blocks BK11, BK31, and BK80 each are the segment to be read. The blocks BK12 to BK30 and blocks BK32 to BK79 each are the segment not to be read.

According to the length of the segment not to be read between the two segments to be read in the magnetic tape, the tape device 200 in the present embodiment determines whether data in the segment not to be read are skipped or are continuously read with data in the segments to be read on both sides. The processing will be described below with reference to FIG. 6.

Figure 6:
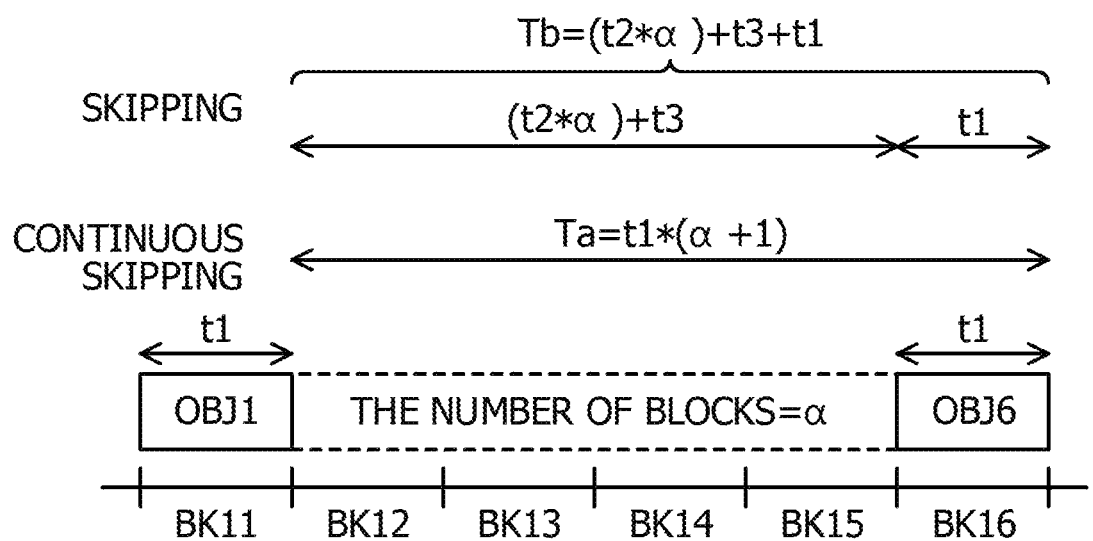
FIG. 6 is a view for describing reading control according to the second embodiment.

FIG. 6 is a view for describing reading control according to the second embodiment. When the segment not to be read is present, total processing time may be made shorter by continuously reading data in the segment not to be read with data in the segments to be read on both sides than by skipping the data in the segment not to be read. Basically, as the segment not to be read is shorter, the possibility of reducing the entire processing time becomes higher by reading data in the segment not to be read with the segments to be read on both sides. This is based on the concept described below.

FIG. 6 illustrates the case where, in segments of blocks BK11 to BK16, reading of an object OBJ1 written in the block BK11 and an object OBJ6 written in the block BK16 is requested. In this case, the blocks BK11 and BK16 correspond to the segments to be read, and the blocks BK12 to BK15 correspond to the segments not to be read. The number of blocks included in the segments not to be read is defined as α. In the example illustrated in FIG. 6, α is 4.

Time taken to read 1 block by the magnetic head is defined as t1. Although the reading rate of the magnetic head actually varies depending on circumstances, for facilitation of explanation, it is given that reading per block takes a uniform time t1. In this case, for example, time taken to read each of the objects OBJ1 and OBJ6 by the magnetic head is t1. When the objects are continuously read from the blocks BK12 to BK16 without skipping the segment not to be read, time Ta taken for reading is acquired by an equation: Ta=t1*(α+1).

When the segment not to be read is skipped, the positioning operation of the magnetic head is performed in the segment. The positioning operation of the magnetic head is broadly divided into a head moving operation of moving the magnetic tape as fast as possible to get the magnetic head closer to a next reading start position (here, the start position of the block BK16), and other operations. Time taken to perform the former head moving operation varies according to the length of the skipped segment, while time taken to perform the latter operations is fixed irrespective of the length of the segment. Thus, in FIG. 6, the latter time is defined as t3. The time t3 includes, for example, time for pause and restart of travelling of the magnetic tape after the end of reading from the block BK11, and time for accurately positioning of the magnetic head at the start position of the block BK16 after the magnetic head has reached the vicinity of the start position.

For the former head moving operation, in FIG. 6, average time taken to move the magnetic head by 1 block in the head moving operation is defined as t2. Although the moving rate of the magnetic head is not actually uniform in each segment, for facilitation for understanding, the average moving rate t2 per block is used. Since the magnetic head does not read data in the head moving operation, the moving rate of the magnetic head in the head moving operation is higher than the moving rate in the data reading operation of the magnetic head. Accordingly, t2 is smaller than t1.

Thus, time for the positioning operation of the magnetic head in the segment not to be read becomes (t2*α)+t3. Time Tb from the end of reading of the object OBJ1 from the block BK11 to the end of reading of the object OBJ6 from the block BK16, with the blocks BK12 to BK15 being skipped, is acquired by an equation: Tb=(t2*α)+t3+t1.

The time t3 occupies a relatively large proportion in the time for the positioning operation of the magnetic head. For example, the time t3 may be longer than the time t1. According to the block size, the time t3 may be a few times as much as the time t1.

When the segment not to be read is long to some extent, the magnetic tape may be traveled at higher rate than at reading, resulting in that time taken to read data from the segment becomes shorter than time taken to skip the segment. When the segment not to be read is short, due to the presence of the time t3, time taken to read data from this segment may be shorter than time taken to skip the segment. When the segment not to be read is short, the travelling rate of the magnetic tape may not be increased to the highest rate, and in this case, the time t2 becomes also long. Due to such property, the relation in length between the time Ta taken to perform continuous reading and the time Tb taken to perform skipping may be inverted according to the length of the segment not to be read.

The tape device 200 in the present embodiment previously finds a threshold of the length of the segment not to be read, which inverts the relation in length between the time Ta and the time Tb. When the segment not to be read is identified, the tape device 200 compares the length of the segment with the threshold to determine whether data in the segment are skipped or are continuously read with data in the segments to be read on both sides. This may shorten total time taken to read data in the case of requesting reading of separately-located objects in units of small-sized objects.

Actually, the time t2 may vary according to block size. This is due to that time taken to read a servo signal in the positioning operation of the magnetic head varies according to block size. When block size is small, the length of the segments to be read on both sides may be decreased, and in this case, the reading rate of the magnetic head may be lowered. For this reason, according to block size, the time t1 for continuous reading may be shorter than the time t1 including skipping. For these reasons, an optimum threshold may vary according to block size. Thus, according to the set block size, the tape device 200 in the present embodiment performs the above-mentioned reading control by using a threshold suitable for the block.

Figure 7:
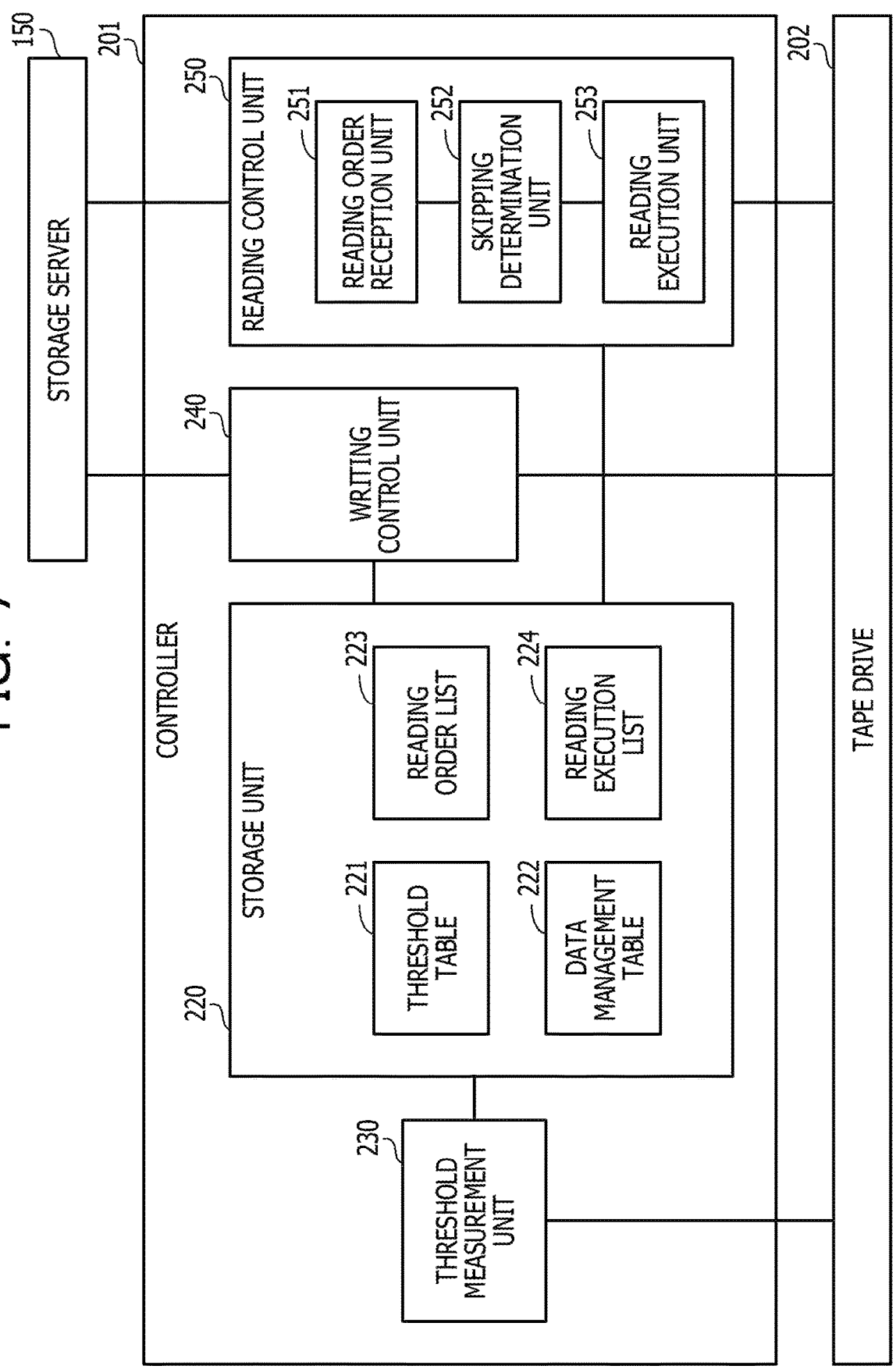
FIG. 7 is a view illustrating exemplary configuration of processing functions of a controller in the tape device.

FIG. 7 is a view illustrating exemplary configuration of processing functions of the controller in the tape device. The controller 201 of the tape device 200 includes a storage unit 220, a threshold measurement unit 230, a writing control unit 240, and a reading control unit 250.

The storage unit 220 is implemented as a storage area of the RAM 212, for example. The storage unit 220 stores a threshold table 221, a data management table 222, a reading order list 223, and a reading execution list 224.

The threshold table 221 holds thresholds for determining whether or not to read data in the segment not to be read in the magnetic tape. The threshold table 221 registers the above-mentioned thresholds by block size. In the present embodiment, the threshold is represented as the number of blocks. The data management table 222 holds information on the association between the object written on the magnetic tape and the writing position (block) of the object on the magnetic tape.

The reading order list 223 is a first in first out (FIFO)-type queue that temporarily holds reading orders received from the storage server 150. The reading execution list 224 is a FIFO-type queue that temporarily holds reading orders decided to be executed by the tape drive 202.

The processing of the threshold measurement unit 230, the writing control unit 240, and the reading control unit 250 is implemented, for example, by the processor 211 executing predetermined programs.

The threshold measurement unit 230 measures a threshold for determining whether or not to read data in the segment not to be read, and registers the threshold in the threshold table 221. The threshold is measured, for example, at initial turn-on of the tape device 200.

The writing control unit 240 instructs the tape drive 202 to write an object onto the magnetic tape according to a writing order received from the storage server 150. The writing control unit 240 associates the object written on the magnetic tape with positional information indicating the writing position of the object on the magnetic tape, and registers the association in the data management table 222.

Before the start of the writing control operation, the writing control unit 240 accepts setting of block size. For example, the block size is specified by the user server 100 via the storage server 150. The writing control unit 240 records the accepted block size in the storage unit 220, and sets the block size to the tape drive 202. After that, in the reading and writing operations using the magnetic tape in the tape drive 202, the set block size is used. For example, to determine the position on the magnetic tape in the reading and writing operations, and the positioning operation, a servo signal is read at intervals corresponding to the block size.

According to the reading order received from the storage server 150, the reading control unit 250 instructs the tape drive 202 to read objects from the magnetic tape. The reading control unit 250 includes a reading order reception unit 251, a skipping determination unit 252, and a reading execution unit 253.

The reading order reception unit 251 receives the reading order from the storage server 150, and registers the reading order in the reading order list 223 in the order received. The received reading order includes identification information for identifying an objects to be read.

The skipping determination unit 252 fetches the reading order from the reading order list 223 at regular time intervals. Based on the data management table 222, the skipping determination unit 252 rearranges the fetched reading orders within a regular time in the order in which respective objects are written. Based on the rearranged reading orders and the data management table 222, the skipping determination unit 252 identifies the segment not to be read located between the segments to be read. The skipping determination unit 252 acquires a threshold corresponding to the block size from the threshold table 221 and compares the number of blocks in the identified segment not to be read with the acquired threshold, thereby determining whether data in the segment not to be read is read or skipped.

The skipping determination unit 252 registers the reading orders finally decided to be performed by the tape drive 202 in the reading execution list 224. The skipping determination unit 252 basically registers the reading orders acquired from the reading order list 223 in the reading execution list 224 one by one. When the skipping determination unit 252 determines to read data in the segment not to be read, the reading order for reading the data in the segment is inserted between reading orders corresponding to the preceding and following segments to be read. In this manner, data in the preceding and following segments to be read and data in the segment not to be read are continuously read.

The reading execution unit 253 fetches the reading orders from the reading execution list 224, and instructs the tape drive 202 to read data according to the fetched reading orders.

The functions of the storage unit 220, the threshold measurement unit 230, the writing control unit 240, and the reading control unit 250 may not be implemented in the tape device 200, but may be implemented in a computer (for example, storage server 150) outside the tape device 200.

FIG. 8 is a view illustrating exemplary configuration of the threshold table. As illustrated in FIG. 8, the threshold table 221 registers each block size that is settable to the tape device 200 in association with a threshold. The threshold is represented as the number of blocks. The threshold substantially indicates the size of the segment not to be read.

In the present embodiment, the threshold indicates a lower limit of the number of blocks in the case where the segment not to be read is determined to be skipped. For example, when the number of blocks included in the segment not to be read is less than the threshold, it is determined to read data in the segment, and when the number of blocks is the threshold or more, it is determined to skip the segment.

Figure 9:
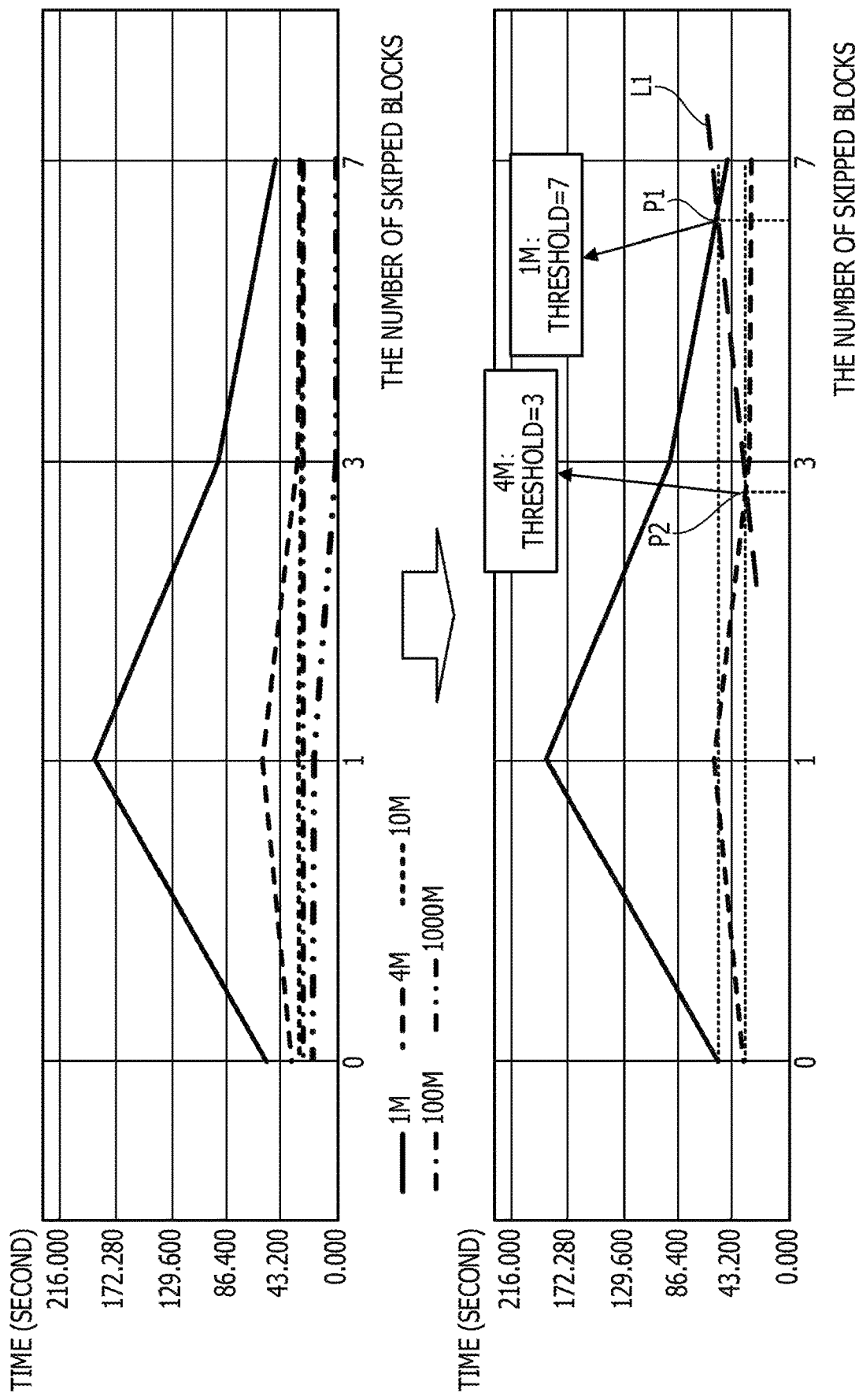
FIG. 9 is a view illustrating a first measurement example about reading capabilities of a tape drive.
Figure 10:
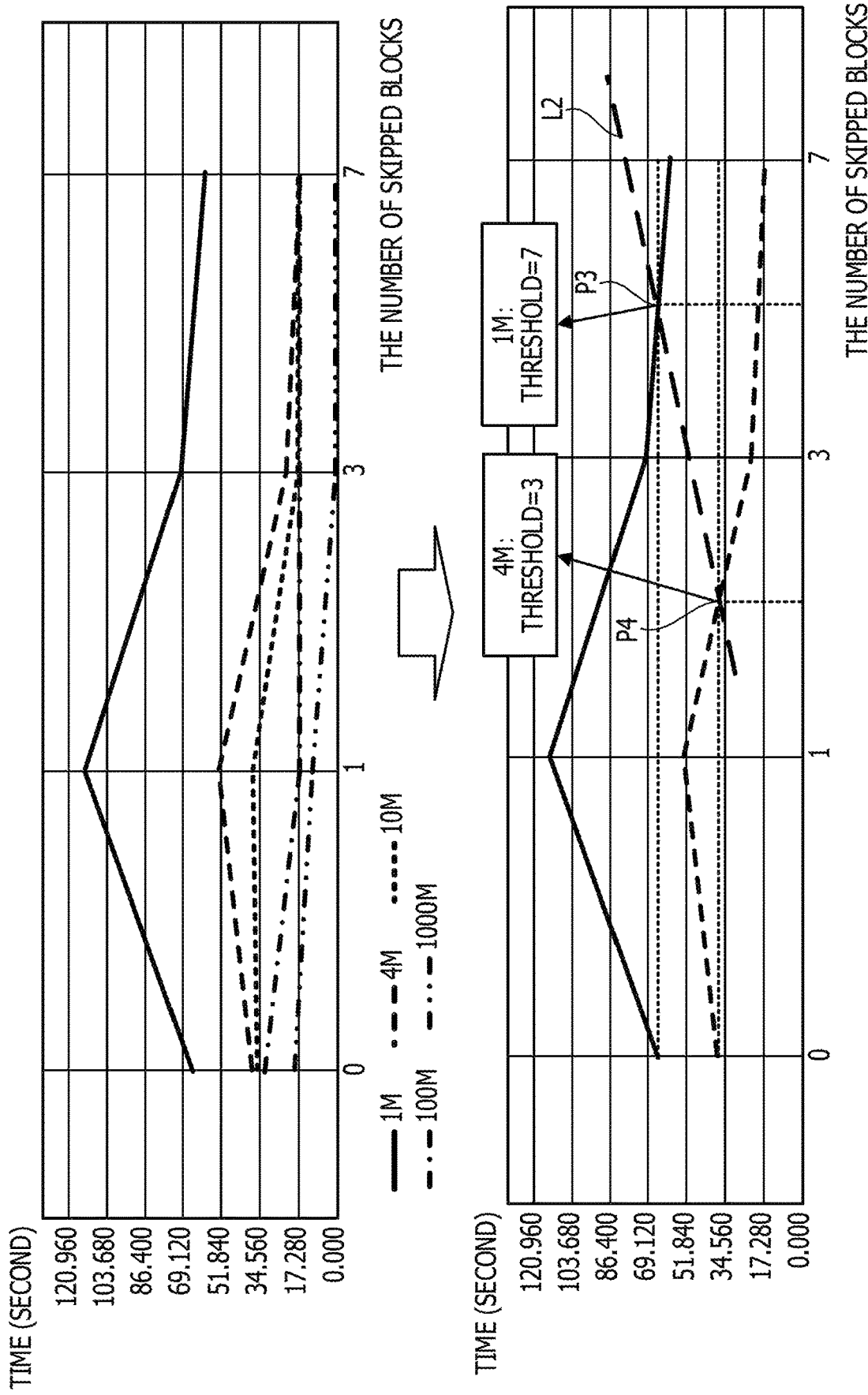
FIG. 10 is a view illustrating a second measurement example about reading capabilities of a tape drive.

FIGS. 9 and 10 illustrate measurement examples of reading capability for each block size and model of the tape drive 202, and exemplary threshold setting will be described below using FIGS. 9 and 10.

FIG. 9 is a view illustrating a first measurement example about reading capabilities of a tape drive. FIG. 10 is a view illustrating a second measurement example about reading capabilities of a tape drive.

FIGS. 9 and 10 illustrate reading capabilities of the tape drives of different models. The tape drive in FIG. 9 has a higher reading rate than the tape drive in FIG. 10. For example, the tape drive in FIG. 10 conforms to a newer standard than the tape drive in FIG. 9.

In FIGS. 9 and 10 illustrate, for the segment of 5 gigabytes on the magnetic tape, total processing time taken to read data while changing the number of skipped blocks. In FIGS. 9 and 10, the number of skipped blocks "0" indicates the case where skipping is not made. This means that data of 5 gigabytes are continuously read. The number of skipped blocks "1" indicates the case where the operation of reading 1 block and skipping next 1 block is repeated. In this case, data of 2.5 gigabytes are actually read. The number of skipped blocks "3" indicates the case where the operation of reading 1 block and skipping following 3 blocks is repeated. In this case, data of 1.2 gigabytes are actually read. The number of skipped blocks "7" indicates the case where the operation of reading 1 block and skipping following 7 blocks is repeated. In this case, data of 0.6 gigabytes are actually read.

In FIGS. 9 and 10 illustrate measurement results of processing time in the case where the block size is changed to 1 megabyte, 4 megabytes, 10 megabytes, 100 megabytes, and 1000 megabytes.

The threshold measurement unit 230 measures the processing time as illustrated in FIG. 9 or 10, and based on the measurement results, estimates a threshold for each block size.

For example, in FIG. 9, when the block size is 1 megabyte, the processing time is largely longer in the case of the number of skipped blocks "1" than the case of the number of skipped blocks "0". As the number of skipped blocks increases to "3" and "7", the processing time gradually decreases. The processing time is shorter in the case of the number of skipped blocks "7" than the case of the number of skipped blocks "0", for example, the case where data are continuously read from all blocks. As illustrated in a lower part in FIG. 9, when the threshold for the block size of 1 megabyte is determined as "7". For example, when the number of blocks in the segment not to be read is less than "7", it is controlled to read data in the segment, and when the number of blocks in the segment is "7" or more, it is controlled to skip data in the segment.

In FIG. 9, when the block size is 4 megabytes, the processing time is longer in the case of the number of skipped blocks "1" than the case of the number of skipped blocks "0". As the number of skipped blocks increases to "3" and "7", the processing time gradually decreases. In the example in FIG. 9, the processing time is shorter in the case of the number of skipped blocks "3" than the case of the number of skipped blocks "0", for example, the case where data are continuously read from all blocks. As illustrated in the lower part in FIG. 9, when the threshold for the block size of 4 megabytes is determined as "3". As described above, the threshold varies depending on the block size.

In FIG. 10, when the block size is 1 megabyte, the processing time is largely longer in the case of the number of skipped blocks "1" than the case of the number of skipped blocks "0". As the number of skipped blocks increases to "3" and "7", the processing time gradually decreases. The processing time is shorter in the case of the number of skipped blocks "7" than the case of the number of skipped blocks "0", for example, the case where data are continuously read from all blocks. As illustrated in a lower part in FIG. 10, when the threshold for the block size of 1 megabyte is determined as "7".

In FIG. 10, when the block size is 4 megabytes, the processing time is longer in the case of the number of skipped blocks "1" than the case of the number of skipped blocks "0". As the number of skipped blocks increases to "3" and "7", the processing time gradually decreases. In the example in FIG. 10, the processing time is shorter in the case of the number of skipped blocks "3" than the case of the number of skipped blocks "0", for example, the case where data are continuously read from all blocks. As illustrated in the lower part in FIG. 10, when the threshold for the block size of 4 megabytes is determined as "3". As described above, the threshold varies depending on the block size.

As apparent from the comparison of FIG. 9 with FIG. 10, since the reading capabilities of the tape drive vary depending on the model of the tape drive, the threshold may vary. For this reason, when the plurality of tape device 200 are present, the tape devices 200 each may measure the threshold. In each of the tape device 200, a threshold suitable for the model of the mounted tape drive may be set in advance.

Using the measurement results in FIG. 9 or 10, the threshold is found for each of the five types of block size. Using the measurement results, a threshold of any block size other than the five types of block size may be found by interpolation. In this case, when determining whether or not to skip data in the segment not to be read, the skipping determination unit 252 of the reading control unit 250 calculates the threshold used for the determination by interpolation.

For example, as illustrated in the lower part in FIG. 9, out of the graph in the case of block size of 1 megabyte, an intersection of the graph in the range of the number of skipped blocks "1" or more and the processing time in the case of the number of skipped blocks "0" is defined as P1. Out of the graph in the case of block size of 4 megabytes, an intersection of the graph in the range of the number of skipped blocks "1" or more and the processing time in the case of the number of skipped blocks "0" is defined as P2. As an example, the skipping determination unit 252 may perform interpolation using a straight line L1 coupling the intersection P1 to the intersection P2 to find a threshold in the case where the block size is larger than 1 megabyte and smaller than 4 megabytes.

Also in FIG. 10, interpolation is performed in the similar manner. As illustrated in the lower part in FIG. 10, out of the graph in the case of block size of 1 megabyte, an intersection of the graph in the range of the number of skipped blocks "1" or more and the processing time in the case of the number of skipped blocks "0" is defined as P3. Out of the graph in the case of block size of 4 megabytes, an intersection of the graph in the range of the number of skipped blocks "1" or more and the processing time in the case of the number of skipped blocks "0" is defined as P4. As an example, the skipping determination unit 252 may perform interpolation using a straight line L2 coupling the intersection P3 to the intersection P4 to find a threshold in the case where the block size is larger than 1 megabyte and smaller than 4 megabytes.

Figure 11:
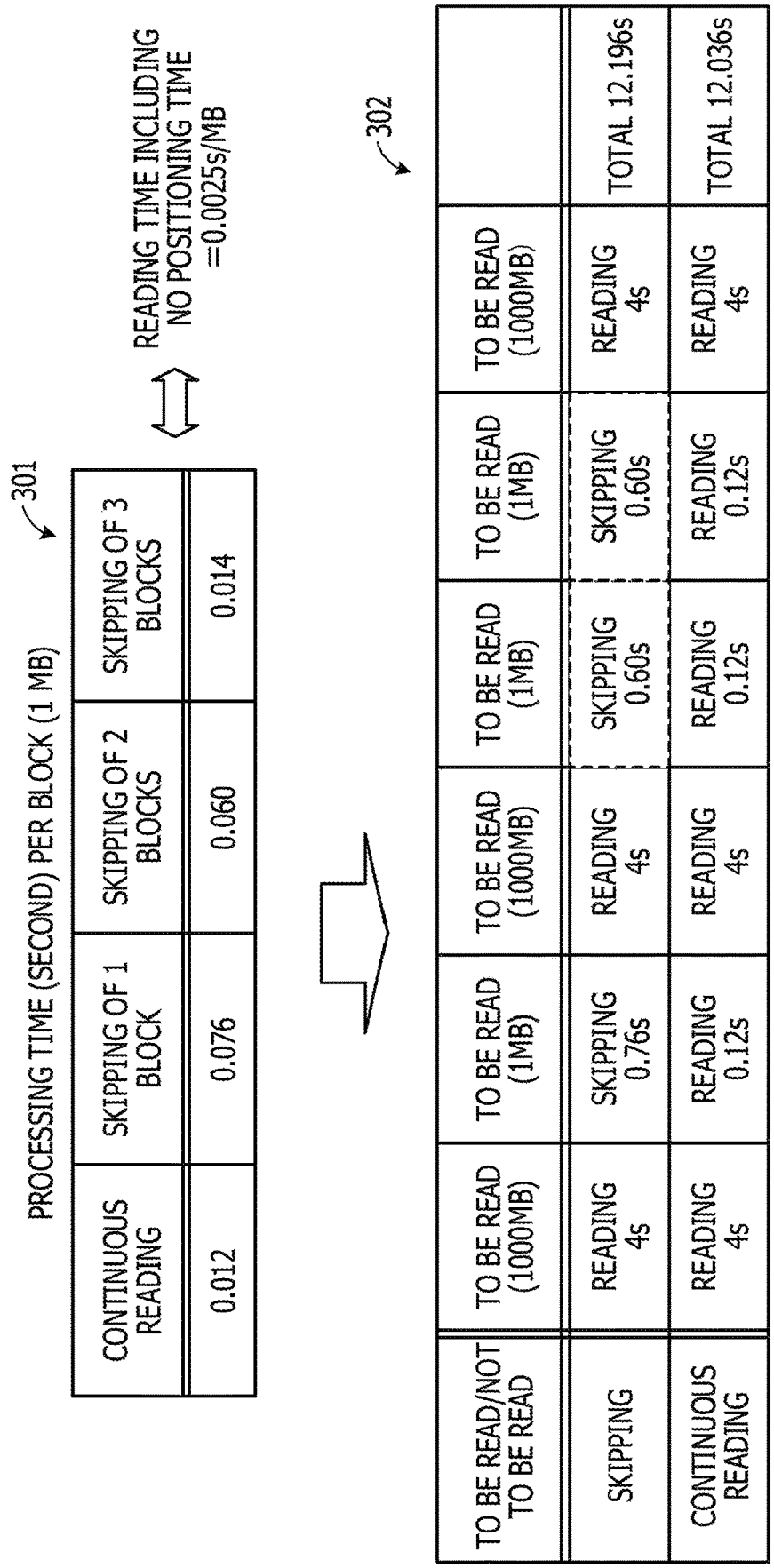
FIG. 11 is a view illustrating exemplary time taken to read data.

FIG. 11 is a view illustrating exemplary time taken to read data.

A table 301 in FIG. 11 indicates exemplary processing time per block calculated from measurement results as illustrated in FIGS. 9 and 10. The block size is set to 1 megabyte. In the table 301, the processing time for "continuous reading" refers to time find by dividing the total processing time in the case of continuously reading an entire segment of predetermined size by the number of blocks in the segment. The processing time for "skipping of 1 block" refers to time find by dividing the total processing time in the case of skipping 1 block between blocks in the same segment by the number of blocks in the segment. The processing time for "skipping of 2 blocks" refers to time find by dividing the total processing time in the case of skipping 2 blocks between blocks in the same segment by the number of blocks in the segment. The processing time for "skipping of 3 blocks" refers to time find by dividing the total processing time in the case of skipping 3 blocks between blocks in the same segment by the number of blocks in the segment.

The processing time for "skipping of 1 block", "skipping of 2 blocks", and "skipping of 3 blocks" in the table 301 includes time taken to position the magnetic head. When all blocks are read at the highest rate, the reading time of the magnetic head is 0.0025 second. This time does not include time for positioning. Comparison of this time with the processing time for "skipping of 1 block", "skipping of 2 blocks", and "skipping of 3 blocks" demonstrates that the time for positioning occupies a large proportion in the total time for reading.

The processing time for "continuous reading" refers to processing time in the case of starting reading from the state where the magnetic head stops at the head of the segment. The processing time is much longer than time including no time for positioning.

In the example of the table 301, the processing time for each of "skipping of 1 block", "skipping of 2 blocks", and "skipping of 3 blocks" is longer than the processing time for "continuous reading". In this example, when the segment not to be read includes 3 blocks or less, the total processing time is shorter in continuously reading data in the segment not to be read along with data in preceding and following segments to be read than in skipping the data in the segment not to be read. For example, in this case, the threshold is larger than the number of blocks "3".

A table 302 in FIG. 11 indicates an example of processing time in the case of actually reading data in the tape drive having the characteristics in the table 301. For example, it is assumed that a segment to be read of 1000 megabytes, a segment not to be read of 1 megabyte, a segment to be read of 1000 megabytes, a segment not to be read of 2 megabytes, and a segment to be read of 1000 megabytes are present in this order.

According to the table 302, when the segments not to be read are skipped, the total processing time is 12.196 seconds. When data in the segments to be read and data in the segments not to be read are continuously read, the total processing time is 12.036 seconds. In this case, continuous reading may shorten the total processing time.

The processing of the tape device 200 will be described below with reference to FIGS. 7 and 12-14.

Figure 12:
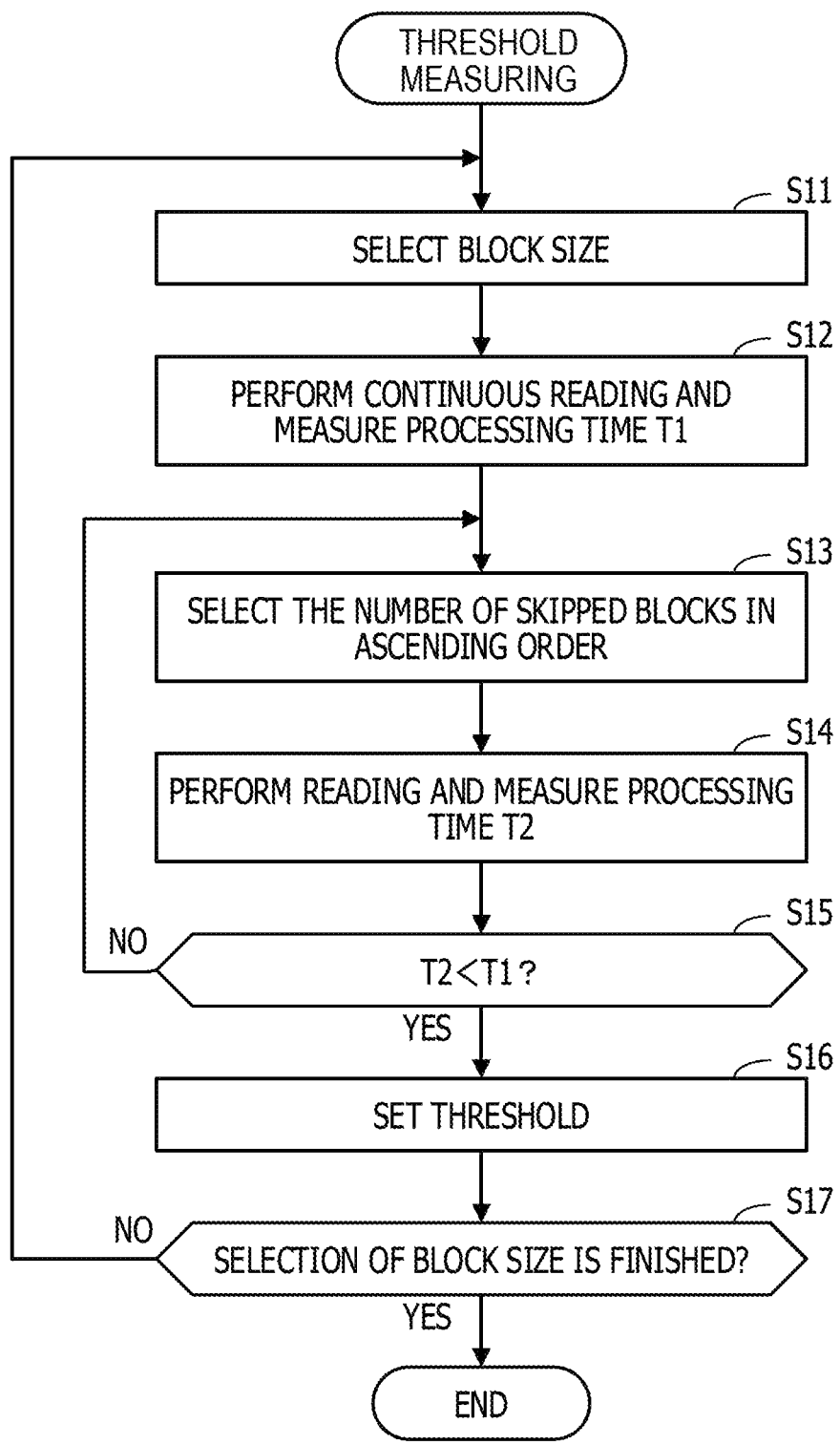
FIG. 12 is an exemplary flowchart illustrating threshold measuring processing.

FIG. 12 is an exemplary flowchart illustrating threshold measuring processing. The processing in FIG. 12 is executed as initial setting processing of the tape device 200. For example, the processing is executed at initial turn-on of the tape device 200 and at start of the operation of a system into which the tape device 200 is integrated. In the processing in FIG. 12, a test magnetic tape is mounted on the tape drive 202.

[Step S11] The threshold measurement unit 230 selects one type of block size that is settable to the tape device 200. The threshold measurement unit 230 sets the selected block size to the tape drive 202.

[Step S12] The threshold measurement unit 230 causes the tape drive 202 to continuously reading data in the segment (test segment) of predetermined size on the magnetic tape. The threshold measurement unit 230 measures processing time T1 from outputting of an instruction to perform continuous reading to the tape drive 202 to the completion of continuous reading.

[Step S13] The threshold measurement unit 230 selects the number of skipped blocks in ascending order. Note that a minimum value of the number of skipped blocks is "1".

[Step S14] The threshold measurement unit 230 causes the tape drive 202 to read the above-mentioned test segment to which the selected number of skipped blocks is applied. In the reading, the selected number of skipped blocks are slapped between blocks to be read. For example, when the number of skipped blocks is "2", the operation of reading data from 1 block, skipping following 2 blocks, reading data from next 1 block, and skipping following 2 blocks is performed in the entire test segment.

The threshold measurement unit 230 measures processing time T2 from outputting of an instruction to perform such reading to the tape drive 202 to the completion of continuous reading.

[Step S15] The threshold measurement unit 230 determines whether or not the processing time T2 measured in Step S14 is shorter than the processing time T1 measured in Step S12. When the processing time T2 is the processing time T1 or more, the threshold measurement unit 230 moves the processing to Step S13, and selects the number of skipped blocks that is larger by one scale in Step S13. When the processing time 12 is less than the processing time T1, the threshold measurement unit 230 executes processing in Step S16.

[Step S16] The threshold measurement unit 230 sets the number of skipped blocks selected last in Step S13, as a threshold corresponding to the block size selected in Step S11, to the threshold table 221.

[Step S17] The threshold measurement unit 230 determines whether or not to finish selection of the block size. When any unselected block size that is settable to the tape device 200 is present, the threshold measurement unit 230 moves the processing to Step S11, and selects one type of unselected block size in Step S11. When all types of the settable block size have been selected, the threshold measurement unit 230 terminates the processing.

Figure 13:
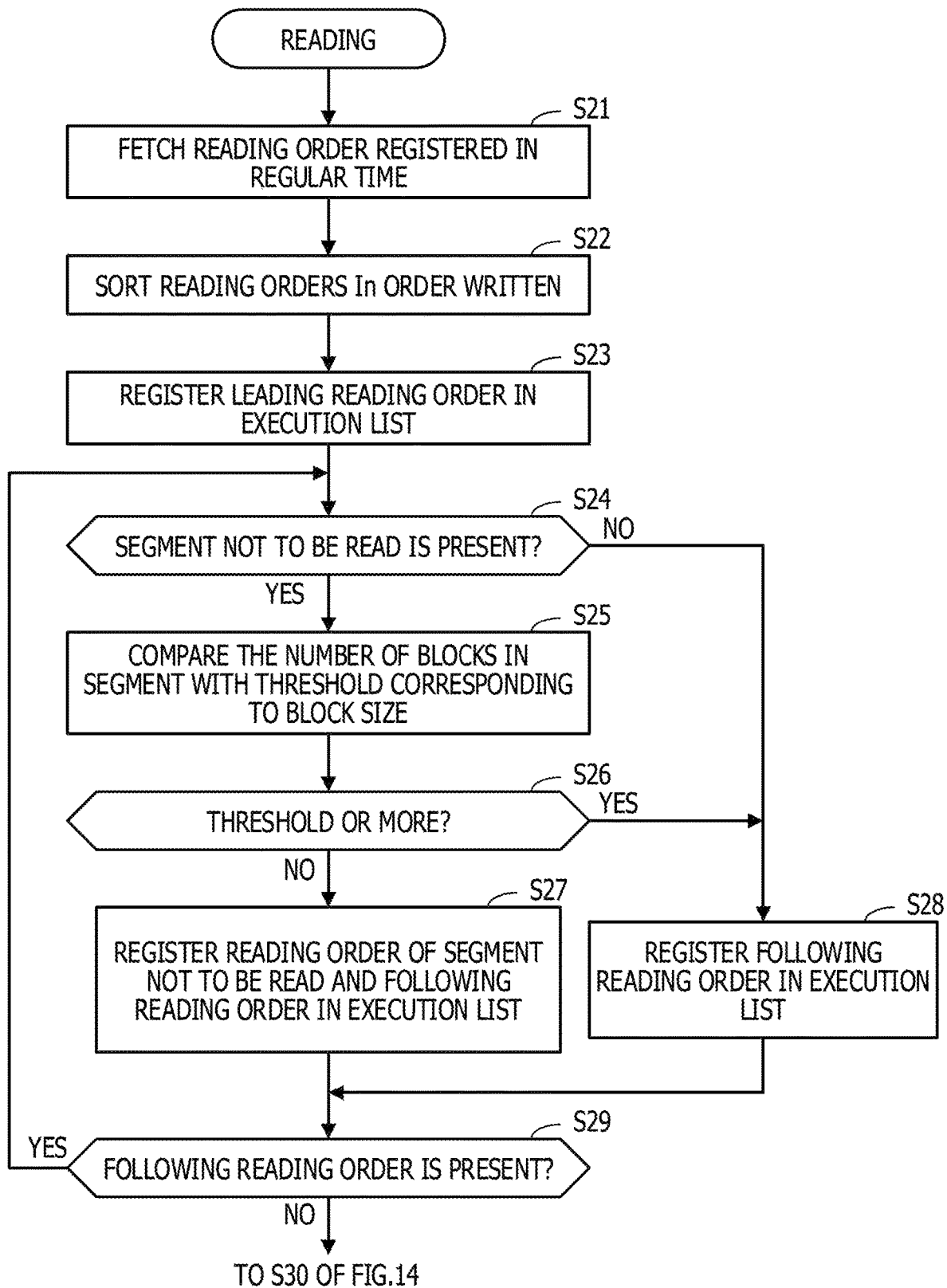
FIG. 13 is an exemplary flowchart illustrating reading processing.
Figure 14:
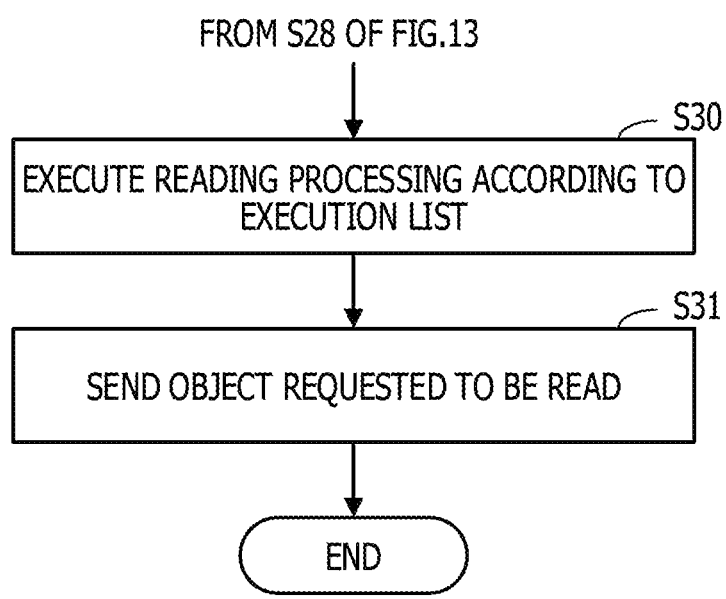
FIG. 14 is an exemplary flowchart illustrating reading processing.

FIGS. 13 and 14 are exemplary flowcharts illustrating reading processing. The processing in FIGS. 13 and 14 is executed at regular time intervals. In parallel to the processing in FIGS. 13 and 14, the reading order reception unit 251 sequentially registers the reading orders received from the storage server 150 in the reading order list 223.

[Step S21] The skipping determination unit 252 fetches the reading orders registered in the reading order list 223 within the last regular time from the reading order list 223. The reading order includes information for identifying the range of objects to be read.

The reading orders registered in the reading order list 223 within the regular time are fetched, but as another example, a predetermined number of reading orders registered last in the reading order list 223 may be fetched. In this case, the processing in FIGS. 13 and 14 is executed each time a predetermined number of reading orders are registered in the reading order list 223.

[Step S22] The skipping determination unit 252 sorts the objects corresponding to the reading orders fetched for the regular time in Step S21 in order written onto the magnetic tape. For example, the skipping determination unit 252 refers to the data management table 222 to identify the block to be read according to each reading order, and sorts the reading orders based on the identified block number. Thereby, the reading orders are rearranged such that respective objects are disposed along a track of the magnetic tape.

[Step S23] The skipping determination unit 252 fetches the leading reading order from the set of sorted reading orders, and registers the leading reading order in the reading execution list 224. At this time, for example, the registered reading order includes information indicating the block to be read in the magnetic tape.

[Step S24] The skipping determination unit 252 determines whether or not any segment not to be read is present between the segment to be read indicated by the reading order registered last in the reading execution list 224 and the segment to be read indicated by the following reading order. The "following reading order" refers to the leading reading order in the set of sorted reading orders. The presence or absence of the segment not to be read is determined based on whether or not one or more blocks are present in the range of blocks to be read indicated by each reading order. The skipping determination unit 252 executes processing in Step S25 when the segment not to be read is present, and executes processing in Step S28 when the segment not to be read is not present.

[Step S25] The skipping determination unit 252 acquires the block size set to the tape drive 202, and acquires the threshold corresponding to the acquired block size from the threshold table 221. The skipping determination unit 252 compares the number of blocks included in the segment not to be read with the threshold acquired from the threshold table 221.

[Step S26] Based on the comparison result in Step S25, the skipping determination unit 252 executes the processing in Step S28 when the number of blocks included in the segment not to be read is the threshold or more, and executes the processing in Step S27 when the number of blocks included in the segment not to be read is less than the threshold.

[Step S27] The skipping determination unit 252 generates the reading order for reading objects from the segment not to be read. The reading order includes information indicating the range of blocks included in the segment not to be read. The skipping determination unit 252 registers the generated reading order in the reading execution list 224. The skipping determination unit 252 fetches the leading reading order (for example, the above-mentioned "following reading order") from the set of sorted reading orders, and registers the leading reading order in the reading execution list 224. At this time, for example, the registered reading order includes information indicating the block to be read in the magnetic tape.

According to the processing in Step S27, the objects in the segment not to be read are read from the magnetic tape without being skipped. For example, in below-mentioned Step S30, objects in the preceding segment to be read, objects in the segment not to be read, and the following objects in the segment to be read are continuously read from the magnetic tape.

[Step S28] The skipping determination unit 252 fetches the leading reading order (for example, the above-mentioned "following reading order") from the set of sorted reading orders, and registers the leading reading order in the reading execution list 224. At this time, for example, the registered reading order includes information indicating the block to be read in the magnetic tape.

When Step S28 is executed following Step S26, the reading order for reading objects from the segment not to be read is not registered in the reading execution list 224. Thereby, in below-mentioned Step S30, the tape drive 202 skips the segment not to be read.

[Step S29] The skipping determination unit 252 determines whether or not the following reading order is present among the set of sorted reading orders. When the following reading order is present, the skipping determination unit 252 executes the processing in Step S24. When no reading order is present, the skipping determination unit 252 moves the processing to Step S30.

[Step S30] The reading execution unit 253 fetches the reading orders from the reading execution list 224 in order, and instructs the tape drive 202 to execute the reading processing according to the fetched reading orders.

In the tape drive 202, for example, for the objects corresponding to the reading orders registered in the reading execution list 224 according to the processing in Step S27, first, the objects corresponding to the preceding reading order are continuously read from the magnetic tape. The objects corresponding to the following reading order are continuously read from the magnetic tape.

[Step S31] The reading execution unit 253 acquires the objects read from the magnetic tape from the tape drive 202. The reading execution unit 253 sends only the objects requested to be read (objects to be read according to the reading order fetched from the reading order list 223) among the acquired objects to the storage server 150. When the object in the segment not to be read are read, the reading execution unit 253 abandons the object. Actually, the processing in Step S30 and the processing in Step S31 are executed in parallel.

According to the above-described processing of the tape device 200, when a plurality of objects are read from the magnetic tape by skipping some objects, total time for reading may be reduced. For example, as the object size that is the reading unit is smaller, such time-shortening effect becomes larger.

For example, even when the size of the object that is the reading unit is small, the total time for reading may be reduced. This achieves the tape device 200 that may handle large-sized objects and have high reading capabilities.

The processing functions of the devices (for example, the control unit 12 of the tape device 10, the user server 100, the storage server 150, and the controller 201 of the tape device 200) illustrated in each of the above embodiments may be implemented by a computer. In such a case, a program in which processing operations of the functions to be equipped in each of the apparatuses are written is provided to the computer, and the computer executes the program. Consequently, the processing functions described above are implemented on the computer. The program in which the processing operations are written may be stored on a computer-readable recording medium. Examples of the computer-readable recording medium include a magnetic memory device, an optical disc, a magneto-optical recording medium, and a semiconductor memory. Examples of the magnetic memory device include a hard disk drive (HDD) and a magnetic tape. Examples of the optical disc include a compact disc (CD), a digital versatile disc (DVD), and a Blu-ray Disc (BD, registered trademark). Examples of the magneto-optical recording medium include a magneto-optical (MO) disk.

In order to distribute the program, for example, portable recording media, such as DVDs and CDs, on which the program is recorded are sold. The program may be stored in a memory device of a server computer and be transferred from the server computer to other computers via a network.

The computer that executes the program stores the program recorded on the portable recording medium or the program transferred from the server computer, for example, in its own memory device. The computer then reads the program from its own memory device and performs processing according to the program. The computer may also directly read the program from the portable recording medium and perform the processing according to the program. Each time a program is transferred from the server computer coupled to the computer via the network, the computer may sequentially perform processing according to the received program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A tape device comprising:
a tape drive configured to read and write data to a tape medium; and
a processor configured to:
determine, when requested to read data from a first segment and a second segment on the tape medium, a data amount in a third segment located between the first segment and the second segment;
compare the data amount with a threshold value that is determined based on a reading characteristic of the tape drive;
instruct the tape drive, when the data amount is the threshold value or more, to read data from the first segment, skip the third segment, and read data from the second segment; and
instruct the tape drive, when the data amount is less than the threshold value, to continuously read data from the first segment, the third segment, and the second segment.

2. The tape device according to claim 1, wherein
the processor is further configured to:
cause the tape drive to perform a first reading operation of reading data from continuous segments of a predetermined size on the tape medium;
measure a first time taken to perform the first reading operation;
cause the tape drive to perform second reading operations of reading data from segments of the predetermined size by skipping a different size of segments;
measure second times taken to perform the second reading operations; and
compare the first time and the second times to determine the threshold value.

3. The tape device according to claim 1, wherein
a plurality of unit sizes of data to be written to the tape medium are settable to the tape drive, and
the processor is further configured to:
determine the threshold value for each of the plurality of unit sizes;
acquire a unit size that is set to the tape drive; and
compare the data amount with a threshold value corresponding to the acquired unit size among threshold values determined for the plurality of unit sizes.

4. A controller comprising:
a memory; and
a processor coupled to the memory and the processor configured to:
determine, when requested to read data from a first segment and a second segment on a tape medium, a data amount in a third segment located between the first segment and the second segment;
compare the data amount with a threshold value that is determined based on a reading characteristic of a tape drive that reads and writes data to the tape medium;
instruct the tape drive, when the data amount is the threshold value or more, to read data from the first segment, skip the third segment, and read data from the second segment; and
instruct the tape drive, when the data amount is less than the threshold value, to continuously read data from the first segment, the third segment, and the second segment.

5. The controller according to claim 4, wherein
the processor is further configured to:
cause the tape drive to perform a first reading operation of reading data from continuous segments of a predetermined size on the tape medium;
measure a first time taken to perform the first reading operation;
cause the tape drive to perform second reading operations of reading data from segments of the predetermined size by skipping a different size of segments;
measure second times taken to perform the second reading operations; and
compare the first time and the second times to determine the threshold value.

6. The controller according to claim 4, wherein
a plurality of unit sizes of data to be written to the tape medium are settable to the tape drive, and
the processor is further configured to:
determine the threshold value for each of the plurality of unit sizes;
acquire a unit size that is set to the tape drive; and
compare the data amount with a threshold value corresponding to the acquired unit size among threshold values determined for the plurality of unit sizes.

7. A non-transitory computer-readable recording medium having stored therein a program that causes a computer to execute a process, the process comprising:
determining, when requested to read data from a first segment and a second segment on a tape medium, a data amount in a third segment located between the first segment and the second segment;
comparing the data amount with a threshold value that is determined based on a reading characteristic of a tape drive that reads and writes data to the tape medium;
instructing the tape drive, when the data amount is the threshold value or more, to read data from the first segment, skip the third segment, and read data from the second segment; and
instructing the tape drive, when the data amount is less than the threshold value, to continuously read data from the first segment, the third segment, and the second segment.

8. The non-transitory computer-readable recording medium according to claim 7, the process further comprising:
causing the tape drive to perform a first reading operation of reading data from continuous segments of a predetermined size on the tape medium;
measuring a first time taken to perform the first reading operation;
causing the tape drive to perform second reading operations of reading data from segments of the predetermined size by skipping a different size of segments;

measuring second times taken to perform the second reading operations; and comparing the first time and the second times to determine the threshold value.

9. The non-transitory computer-readable recording medium according to claim 7, wherein a plurality of unit sizes of data to be written to the tape medium are settable to the tape drive, and the process further comprises:

determining the threshold value for each of the plurality of unit sizes;

acquiring a unit size that is set to the tape drive; and comparing the data amount with a threshold value corresponding to the acquired unit size among threshold values determined for the plurality of unit sizes.

* * * * *